United States Patent [19]
Bergmans

[11] 3,794,822
[45] Feb. 26, 1974

[54] ELECTRONIC FLASH UNIT

[75] Inventor: Jozef Hubert Michel Bergmans, Emmasingel, Eindhoven, Netherlands

[73] Assignee: U.S. Philips Corporation, New York, N.Y.

[22] Filed: Sept. 24, 1971

[21] Appl. No.: 183,437

[30] Foreign Application Priority Data
Sept. 29, 1970 Netherlands ............... 7014266

[52] U.S. Cl. ............................................. 240/1.3
[51] Int. Cl. ......................................... G03b 15/02
[58] Field of Search .................................. 240/1.3

[56] References Cited
UNITED STATES PATENTS
3,544,781  12/1970  Schmidt ............................. 240/1.3
2,976,398   3/1961  McKee et al. ....................... 240/1.3

FOREIGN PATENTS OR APPLICATIONS
1,206,311  12/1965  Germany ............................ 240/1.3
1,229,845  12/1966  Germany ............................ 240/1.3
1,342,075   9/1963  France ............................... 240/1.3

*Primary Examiner*—Fred L. Braun
*Attorney, Agent, or Firm*—Frank R. Trifari

[57] ABSTRACT

In an electronic flash unit, a simple solution is effected for rotating a reflector associated with the unit so that a scene to be photographed can be lighted by direct flash illumination or by indirect flash illumination. According to the invention, the axis of rotation of the reflector coincides with a horizontal rib of the box-like flash unit. The longitudinal axis of an elongated electronic flash lamp provided in said reflector is at right angles to the axis of rotation of the reflector.

1 Claim, 2 Drawing Figures

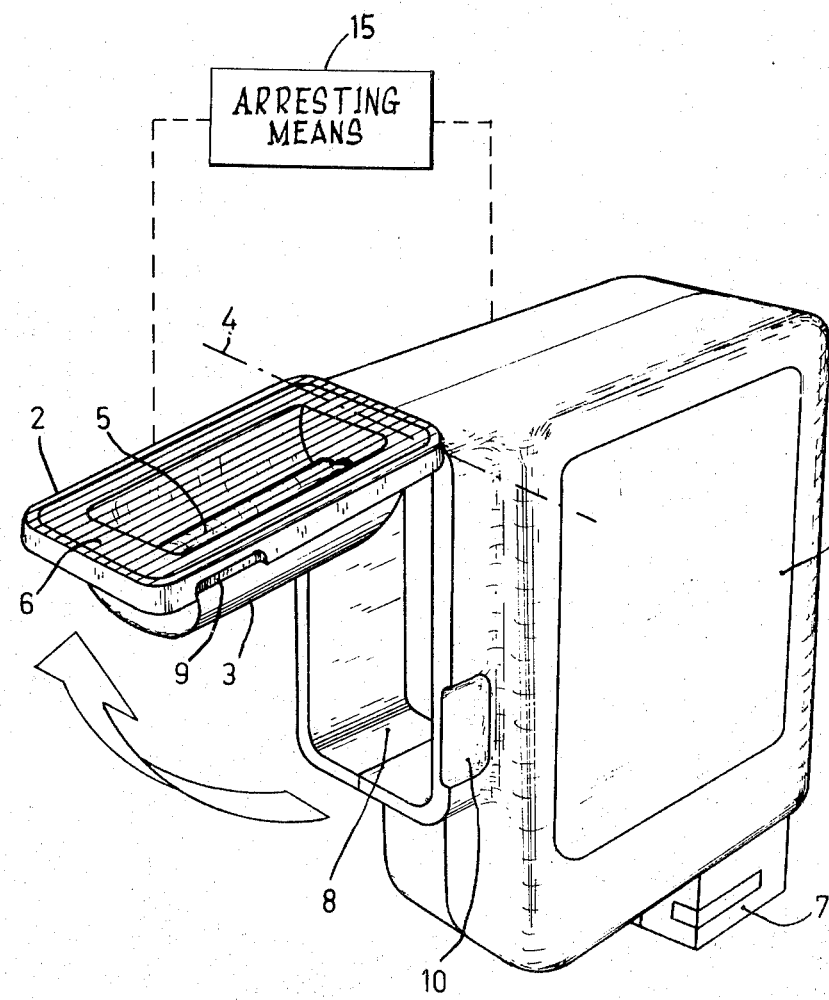

ELECTRONIC FLASH UNIT

This invention relates to an electronic flash unit including a housing and a reflector which is rotatable relative to said housing, said reflector being arrestable in at least two positions.

In this connection an electronic flash unit is to be understood to mean a unit for supplying an electronic flash tube (gas discharge flash tube). It is used, for example, when taking flash-photographs.

An advantage of the rotatable reflector is that in a given case direct light can be projected from the flash tube via the reflector onto a person or object to be photographed, and indirect light in another case. The latter occurs, for example, when the reflector is rotated in such manner that the flash is directed to the ceiling of a room; the light reflected by this ceiling then gives a diffused lighting of the scene to be photographed.

A known flash unit of the kind described in the preamble is described in German Utility application No. 1.965.059.

A drawback of this known electronic flash unit is that the reflector is substantially within the envelope of the housing. This leads to a rather complicated operation of rotating the reflector. In addition when the housing has a transparent cap at the area of the reflector, the persons to be photographed may not see whether a direct or an indirect flash will be produced.

An object of the present invention is to provide an electronic flash unit in which the reflector can be rotated in a simple manner and in which a person to be photographed can easily observe in advance whether direct light or indirect light will be used when the photograph is taken.

According to the invention an electronic flash unit including a housing and a reflector rotatable relative to said housing, said reflector being arrestable in at least two positions, is characterized in that the axis of rotation of the reflector substantially coincides with a tangent on the outer surface of the housing.

An advantage of this electronic flash unit is the simple operation of the reflector as well as the possibility of easily seeing from a distance whether the reflector will produce a direct or an indirect flash.

The axis of rotation of the reflector may divide, for example, a side face of the housing in two parts.

In a special embodiment of an electron flash unit according to the invention in which the housing has the shape of a rectangular parallelepiped the axis of rotation of the reflector substantially coincides with a rib of the housing.

An advantage of this special embodiment is that the light-radiating surface of the unit may then be substantially as large as a side face of the housing. This may lead to an extremely compact structure of the flash unit.

It is possible that the rear side of the reflector engages a flat side face of the housing in at least one of its positions.

In a further special embodiment of the flash unit the reflector is at least largely present in a cavity of the housing in one arrestable position.

Also this special embodiment provides the advantage of a compact structure of the unit which is important also with a view to transport.

In the last-mentioned special embodiment the angle between the two arrestable positions of the reflector is preferably between 80° and 90°.

An advantage thereof is that when the reflector is present in the cavity, a direct flash can be produced and an indirect flash can be produced in the second position.

When using an elongated electronic flash lamp, the longitudinal axis of this lamp may be arranged, for example, parallel to the axis of rotation of the reflector.

In an advantageous embodiment of an electronic flash unit according to the invention for an elongated electronic flash lamp the axis of the lamp is at right angles to the axis of rotation of the reflector.

An advantage of the last-mentioned embodiment is that the reflector may be fairly narrow. The photographer can then simply take the reflector between his fingers and rotate it in a different position. The adjustment of an intermediate position of the reflector between the two extreme positions may also be more accurate in this preferred embodiment. This is because the reflector extends up to a relatively large distance from the axis of rotation. The leg of the flashing angle to be adjusted is then large so that this flashing angle can be better adjusted.

In one embodiment of the flash unit in which the flash from the flash lamp can be timely extinguished by an electric extinguisher which is commanded through a photo-sensitive element receiving reflected light from an object (or person) exposed to the flash lamp, this photo-sensitive element is preferably provided on the side of the flash-unit housing facing the object and not associated with the rotatable reflector. In that case it is achieved that for both a direct flash and an indirect flash the flash lamp can be extinguished at the instant when the object (the person) has been sufficiently exposed to the flash lamp.

In the drawing, FIG. 1 represents a perspective view of the flash unit housing, while FIG. 2 illustrates a means for arresting the reflector.

In order that the invention may be readily carried into effect, some embodiments thereof will now be described in detail by way of example, with reference to the accompanying diagrammatic drawing, which is a perspective view of an electronic flash unit according to the invention.

In FIG. 1 of the drawing, the reference numeral 1 denotes a housing which has substantially the shape of a rectangular parallelepiped. The reference numeral 2 denotes a rotatable part comprising a reflector 3. This part 2 is rotatable about an axis 4 relative to the housing 1, which axis substantially coincides with a rib of the housing 1. The connection between part 2 and housing 1 is a clamping connection, and this in such a manner that in each of the positions to be occupied by part 2, said part remains in said position. The position can be changed with some pressure, for example, by means of the hand. Clamping means for arresting the reflector in at least two positions is shown schematically in the figure as element 15. The dashed lines indicate the mechanical support between the rotatable portion 2 and the housing 1.

The reflector accommodates an elongated electronic flash lamp 5, whose longitudinal axis constitutes an angle of approximately 90° with the axis of rotation 4.

The rotatable part 2 is closed by means of a glass cover 6. The reference numeral 7 denotes a base for mounting on a photocamera.

In the position shown of part 2, the unit is ready for producing an upward flash (bounce flash), that is to say, for obtaining an indirect lighting of the scene before the camera.

For obtaining a direct lighting of this scene the rotatable part 2 is moved against the direction of the arrow about the axis 4 until said part 2 with the reflector 3 is largely moved in a cavity 8 of the housing.

A (flexible) electrical connection not shown extends from the lamp 5 in the part 2 to the interior of the housing 1. The supply equipment for this lamp is present in this housing.

The reference numerals 9 and 10 show recesses in part 2 and housing 1, respectively. These recesses serve for easy holding of the part 2 if this is largely present in the cavity 8 of the housing 1.

What is claimed is:

1. In an electronic flash unit including a housing and reflector, comprising in combination: a rib on to said housing, said reflector having an axis of rotation which substantially coincides with said rib, said reflector being movable between first and second arrestable positions, means for arresting the reflector in at least said first and said second arrestable position, said reflector being capable of emitting a flash toward a subject in each of said positions, said reflector being adapted to receive an elongated electronic flashlamp, the axis of the lamp being oriented at right angles to the axis of rotation of the reflector and wherein said housing is of a substantially rectangular shape, said housing also including a cavity in the wall of the housing which faces the subject to be illuminated, said cavity receiving the reflector in said first of said arrestable positions said reflector emitting direct illumination toward the subject in a direction substantially normal to said wall of the housing when in said first position, the reflector being rotatable about the uppermost edge of said cavity which coincides with said rib, said reflector also being arrestable in said second position rotated about from 80° to 90° from said first arrestable position in a direction away from the housing, said reflection emitting indirect illumination to a subject when in said second position.

* * * * *